(12) United States Patent
Hederstad et al.

(10) Patent No.: US 9,593,741 B2
(45) Date of Patent: Mar. 14, 2017

(54) TRANSMISSION WITH TORSIONAL DAMPER

(71) Applicant: e-AAM Driveline Systems AB, Trollhättan (SE)

(72) Inventors: Magnus Hederstad, Trollhättan (SE); Erik J. Sten, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 3 days.

(21) Appl. No.: 14/707,036

(22) Filed: May 8, 2015

(65) Prior Publication Data
US 2016/0327121 A1 Nov. 10, 2016

(51) Int. Cl.
*F16F 15/30* (2006.01)

(52) U.S. Cl.
CPC .................... *F16F 15/30* (2013.01)

(58) Field of Classification Search
CPC ...... F16F 15/30; F16F 15/3153; F16F 15/315; F16D 3/56; F16D 3/58; F16D 3/64; F16D 3/74; F16D 3/72; F16D 3/50; F16D 1/033; F16D 1/02
See application file for complete search history.

(56) References Cited

U.S. PATENT DOCUMENTS

| | | | | |
|---|---|---|---|---|
| 1,185,208 A | * | 5/1916 | Geyer | F16D 3/56 464/81 |
| 1,473,625 A | * | 11/1923 | Hamren | F16D 3/50 464/7 |
| 1,939,207 A | * | 12/1933 | Duckworth | F16D 3/58 464/85 |
| 2,051,442 A | * | 8/1936 | Geyer | F16D 3/74 464/92 |
| 2,379,175 A | | 6/1945 | Mulheim | |
| 3,677,031 A | | 7/1972 | Zierak et al. | |

(Continued)

FOREIGN PATENT DOCUMENTS

| | | |
|---|---|---|
| BE | 462397 A | 11/1946 |
| CN | 203926471 U | 11/2014 |

(Continued)

OTHER PUBLICATIONS

PCT International Search Report and Written Opinion dated Aug. 10, 2016 for corresponding PCT application No. PCT/US2016/052562, filed May 5, 2016.

*Primary Examiner* — Thomas Diaz
(74) *Attorney, Agent, or Firm* — Harness, Dickey & Pierce, P.L.C.

(57) ABSTRACT

The present teachings provide for a torsional damper and a transmission having a torsional damper. The torsional damper can include first and second members. The first member can include a first hub, a first outer portion, and a plurality of first spokes. The first hub can be non-rotatably coupled to an input member of the transmission. The first spokes can extend radially between the first hub and the first outer portion. The first spokes can couple the first outer portion to the first hub. The second member can include a second hub and a second outer portion. The second hub can be non-rotatably coupled to an output member of the transmission. The second outer portion can be radially outward of the second hub and can be fixedly coupled to the second hub and to the first outer portion.

20 Claims, 5 Drawing Sheets

(56) References Cited

U.S. PATENT DOCUMENTS

| | | | |
|---|---|---|---|
| 3,864,940 | A | 2/1975 | Black |
| 5,324,234 | A | 6/1994 | Kuribayashi |
| 5,630,758 | A | 5/1997 | Rivin |
| 5,829,320 | A | 11/1998 | Abraham et al. |
| 5,863,253 | A | 1/1999 | Rohs et al. |
| 7,025,681 | B2 | 4/2006 | Geislinger |
| 8,418,822 | B2 | 4/2013 | Geislinger et al. |

FOREIGN PATENT DOCUMENTS

| | | |
|---|---|---|
| DE | 102013205175 A1 | 9/2014 |
| FR | 2516187 A1 | 5/1983 |

\* cited by examiner

TRANSMISSION WITH TORSIONAL DAMPER

FIELD

The present disclosure relates to a transmission with a torsional damper.

BACKGROUND

This section provides background information related to the present disclosure which is not necessarily prior art.

Transmissions typically include rotating shafts that transmit high levels of torque from an input member to an output member. Additionally, drive modules that employ one or more electric motors that are selectively operable to provide propulsion and/or torque vectoring capabilities typically include input shafts that couple the electric motor to the transmission. Such input shafts can provide torque intermittently or in frequently reversing directions, which can induce mechanical shock through the transmission components. In order to reduce mechanical shock, reduce wear on various components in the transmission, and to dampen gear noises caused by the transmission error, some degree of torsional compliance or torsional flexibility within the rotating components of the transmission is desirable. However, torsional compliance can be difficult to achieve in a rotating shaft or in the connection between two rotating shafts, while maintaining adequate strength for transferring high levels of torque through the transmission and minimizing packaging size of the transmission. Adequate torsional compliance can be particularly difficult to achieve in a hollow rotating shaft or in the connection between two hollow rotating shafts.

SUMMARY

This section provides a general summary of the disclosure, and is not a comprehensive disclosure of its full scope or all of its features.

The present teachings provide for a transmission including an input member, an output member, and a torsional damper. The torsional damper can include a first member and a second member. The first member can include a first hub, a first outer portion, and a plurality of first spokes. The first hub can be non-rotatably coupled to the input member for common rotation with the input member about an axis. The first outer portion can be radially outward of the first hub. The first spokes can extend radially between the first hub and the first outer portion. The first spokes can couple the first outer portion to the first hub. The second member can include a second hub and a second outer portion. The second hub can be non-rotatably coupled to the output member for common rotation with the output member about the axis. The second outer portion can be radially outward of the second hub and can be fixedly coupled to the second hub and to the first outer portion.

The present teachings further provide for a transmission including a housing, a first shaft, a second shaft, and a torsional damper. The first shaft can be supported within the housing for rotation about an axis. The second shaft can be received concentrically within the first shaft. The torsional damper can include a first member and a second member. The first member can include a first hub and a plurality of first spokes. The first hub can define a central aperture that is coaxial with the axis. A proximal end of each first spoke can be fixedly coupled to the first hub. Each first spoke can extend radially outward from the first hub to a distal end of the first spoke. The second member can include a second hub and an outer portion. The second hub can define a central aperture that is coaxial with the axis. The outer portion can be fixedly coupled to the second hub and can extend radially outward from the second hub. The outer portion can be fixedly coupled to the distal end of each first spoke. One of the first and second hubs can be fixedly coupled to the first shaft for common rotation about the axis. The second shaft can extend through the central apertures of the first and second hubs and can be drivingly coupled to the other one of the first and second hubs.

The present teachings further provide for a torsional damper for connecting an input member to an output member. The torsional damper can include a first member and a second member. The first member can be disposed about an axis and can include a first hub and a first disc. The first hub can be adapted to be non-rotatably coupled to the first shaft. The first disc can define a plurality of first spokes. A proximal end of each first spoke can be fixedly coupled to the first hub. Each first spoke can extend radially outward from the first hub to a distal end of the first spoke. The second member can be disposed about the axis and can including a second hub and a second disc. The second hub can be adapted to be non-rotatably coupled to the second shaft. The second disc can be fixedly coupled to the second hub and can extend radially outward from the second hub. The second disc can be fixedly coupled to the distal end of each first spoke.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
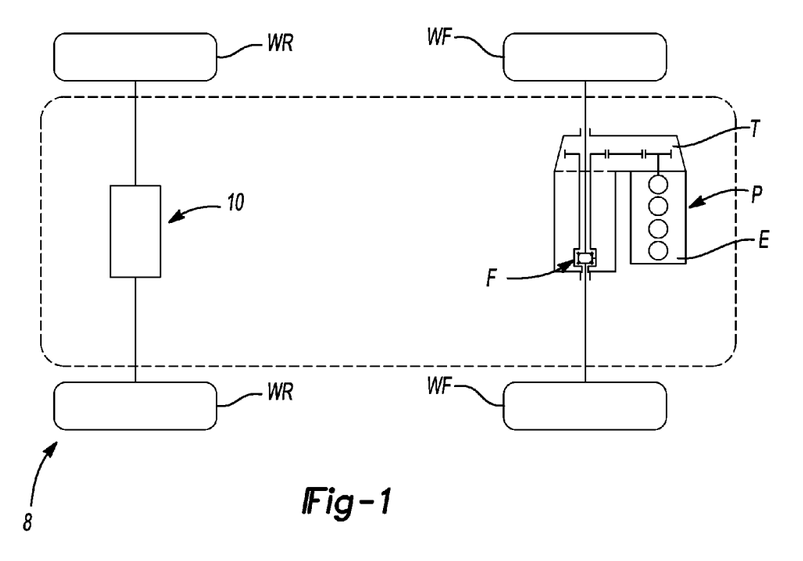
FIG. 1 is a schematic illustration of a vehicle having a drive module constructed in accordance with the teachings of the present disclosure.

With reference to FIG. 1 of the drawings, an exemplary vehicle 8 is depicted with a power train P, a conventional front-wheel drive drivetrain F that can be driven by the power train P, and a drive module 10 that is constructed in accordance with the teachings of the present disclosure. The power train P can include an internal combustion engine E and a transmission T that can be driven by the engine. The transmission T can output rotary power to the front-wheel drivetrain F, which can transmit rotary power to drive a pair of front vehicle wheels WF. The drive module 10 can be selectively operated to transmit rotary power to a pair of rear vehicle wheels WR.

Figure 2:
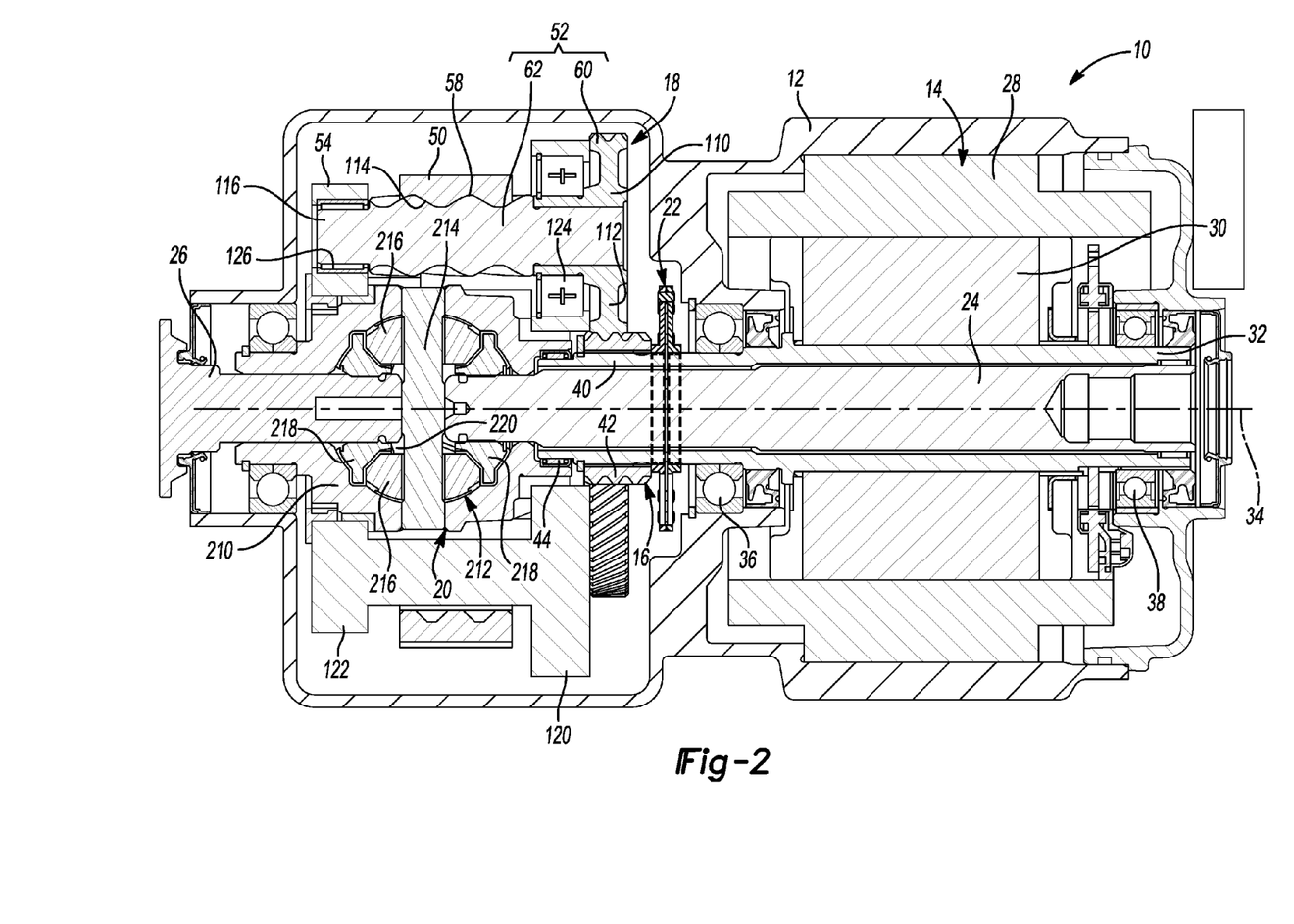
FIG. 2 is a section view of an example of a drive module taken longitudinally along a rotation axis of an output shaft of an electric motor of the drive module, illustrating a torsional damper in accordance with the present disclosure.

With reference to FIG. 2, the drive module 10 is illustrated in greater detail. In the example provided, the drive module 10 can include a housing 12, an electric motor 14, an input pinion 16, a transmission 18, a differential assembly 20, a torsional damper 22, and first and second axle shafts 24 and 26. The housing 12 can define a structure in which the input pinion 16, the transmission 18 and the differential assembly 20 can be housed. The electric motor 14 can include a stator 28 which can be fixedly coupled to the housing 12, a rotor 30, and a hollow output shaft 32. The rotor 30 can be fixedly coupled to the output shaft 32 for common rotation about an axis 34. The output shaft 32 can be supported within the housing 12 by a first bearing 36 and a second bearing 38. The output shaft 32 can be coupled to the torsional damper 22 for common rotation about the axis 34. The input pinion 16 can include a pinion shaft 40 and a pinion gear 42 mounted to the pinion shaft 40 for common rotation about the axis 34. The pinion shaft 40 can be supported within the housing 12 by a third bearing 44 and coupled to the torsional damper 22 for common rotation about the axis 34. The torsional damper 22 is described in greater detail below. While described herein with reference to the drive module 10, it will be appreciated that the torsional damper 22 of the present disclosure is applicable to other power transmitting components where torsional compliance is desirable.

The pinion gear 42 can be drivingly coupled to the transmission 18 to transmit torque therebetween. The transmission 18 can be drivingly coupled to the differential assembly 20 to transmit torque therebetween. It will be appreciated that any type of transmission arrangement could be employed between the electric motor 14 and the differential assembly 20. In the particular example provided, the transmission 18 is a single planetary stage transmission that is disposed concentrically about the rotational axis 34 of the output shaft 32 of the electric motor 14. It is appreciated that other types of transmissions can be used such as dual planetary stage transmissions, compound planetary transmissions, or non-planetary transmissions for example. The transmission 18 can include the input pinion gear 42, which is a sun gear of the transmission 18, a ring gear 50, a plurality of compound planet gears 52 and a planet carrier 54. The ring gear 50 can be disposed concentrically about the input pinion 16 (i.e. about axis 34) and can be non-rotatably coupled to the housing 12 in which the transmission 18 and the differential assembly 20 are received. The ring gear 50 can include a plurality of internal teeth 58.

Each of the compound planet gears 52 can include a first planet gear portion 60 and a second planet gear portion 62. The first planet gear portion 60 can include a hub 110 and a plurality of teeth 112 that are disposed about the hub 110 and meshingly engaged to the input pinion gear 42. The second planet gear portion 62 can be fixedly coupled to the hub 110 of the first planet gear portion 60 for rotation therewith and can include a plurality of teeth 114 and a journal 116 that is disposed on an axial end that is opposite the end that is coupled to the hub 110. The teeth 114 of the second planet gear portion 62 can be meshingly engaged with the internal teeth 58 of the ring gear 50. The first and second planet gear portions 60 and 62 can have different pitch diameters.

The planet carrier 54 can include a first carrier body 120, a second carrier body 122, a plurality of fourth bearings 124, and a plurality of fifth bearings 126. The fourth bearings 124, which can be ball bearings, can be fixedly mounted to the first carrier body 120 and can support the hubs 110 of the first planet gear portions 60 for rotation relative to the first carrier body 120. The fifth bearings 126, which can be roller needle bearings, can be fixedly mounted to the second carrier body 122 and can support the journal 116 of the second planet gear portions 62 for rotation relative to the second carrier body 122.

It will be appreciated that any type of differential arrangement could be employed to transfer differential toque between the transmission 18 and the first and second axle shafts 24, 26. In the particular example provided, the differential assembly 20 can include a differential casing 210 and differential gear set 212. The differential gear set 212 can include a cross-pin 214, a plurality of bevel pinions 216, and a pair of side gears 218. The differential casing 210 can be coupled to the first carrier body 120 and/or the second carrier body 122 for rotation therewith about the rotational axis 34 and can define a cavity 220 into which the bevel pinions 216 and the side gears 218 can be received. The cross-pin 214 can be coupled to the differential casing 210 perpendicular to the rotational axis 34. The bevel pinions 216 can be rotatably mounted on the cross-pin 214. The side gears 218 can be rotatable about the rotational axis 34 and can be meshingly engaged with the bevel pinions 216.

Each of the first and second axle shafts 24 and 26 can be coupled to a corresponding one of the side gears 218 for rotation therewith. The third bearing 44 can be radially between the pinion shaft 40 and a portion of the differential casing 210, such that the third bearing 44 supports the pinion shaft 40 for rotation relative to the differential carrier 210. The first axle shaft 24 can extend through the hollow pinion shaft 40, the torsional damper 22, and the output shaft 32. The second axle shaft 26 can extend from the differential carrier 210 in an opposite axial direction from the first axle shaft 24. Each of the first and second axle shafts 24 and 26 can be drivingly coupled to one of the rear vehicle wheels WR (FIG. 1).

Figure 3:
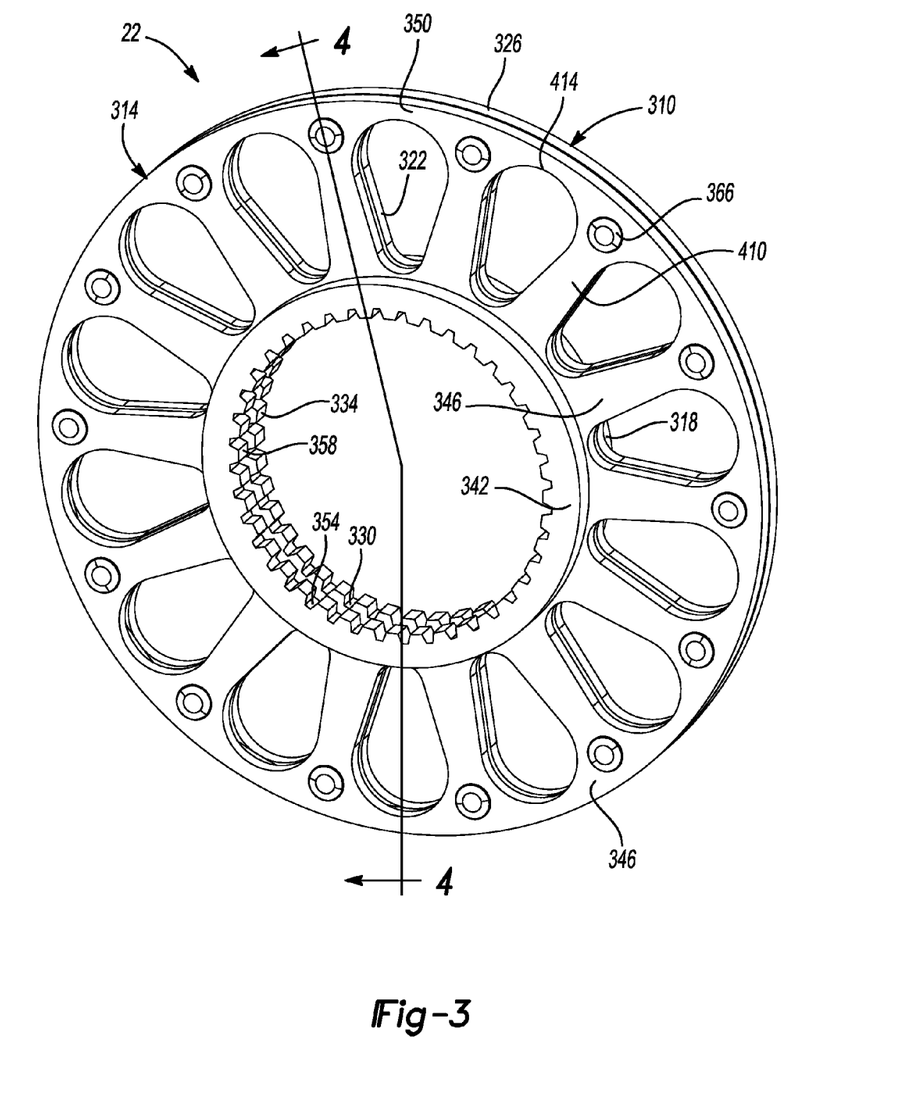
FIG. 3 is a perspective view of the torsional damper of FIG. 2.
Figure 4:
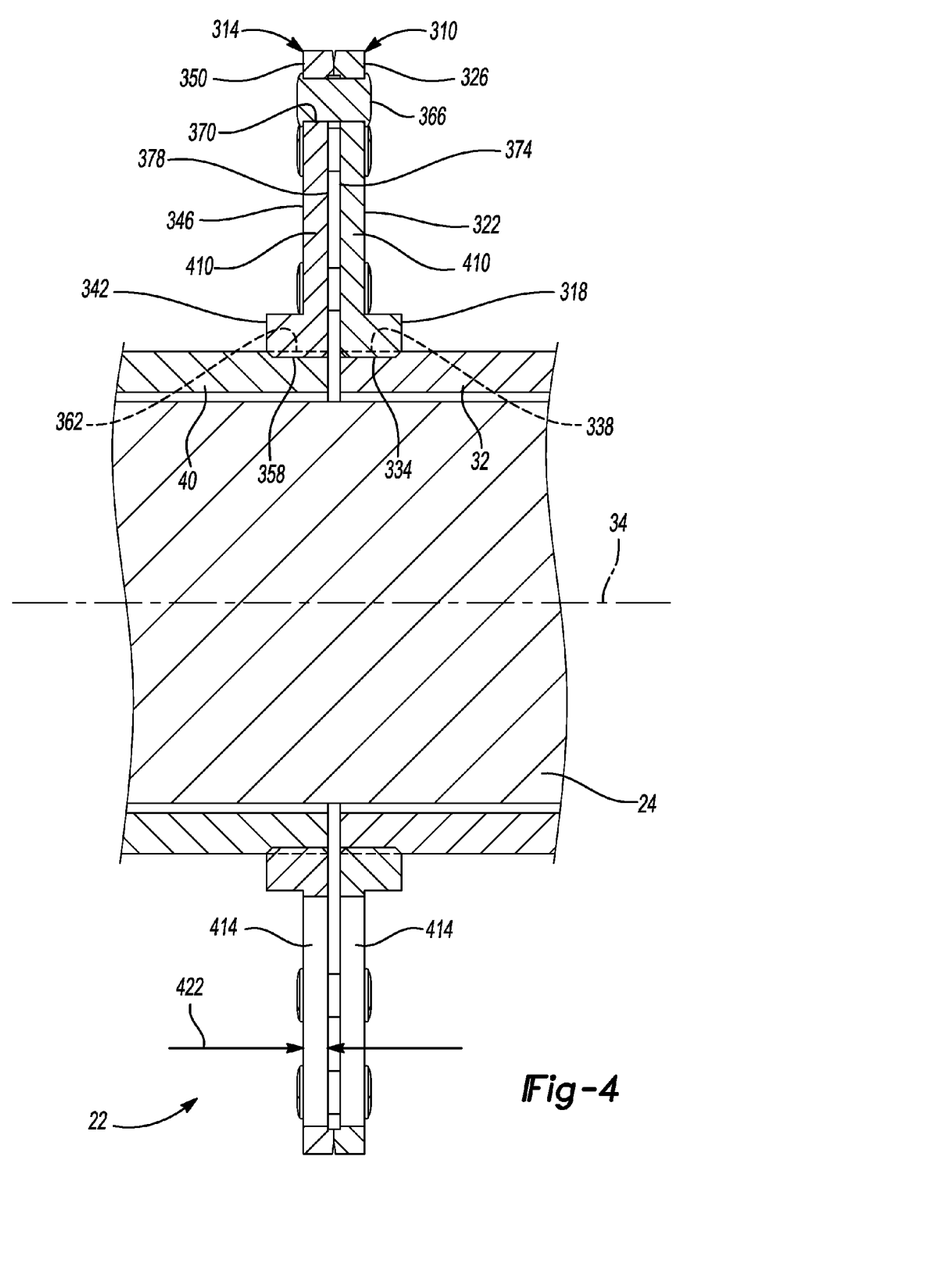
FIG. 4 is a sectional view of the torsional damper taken along line 4-4 of FIG. 3.
Figure 5:
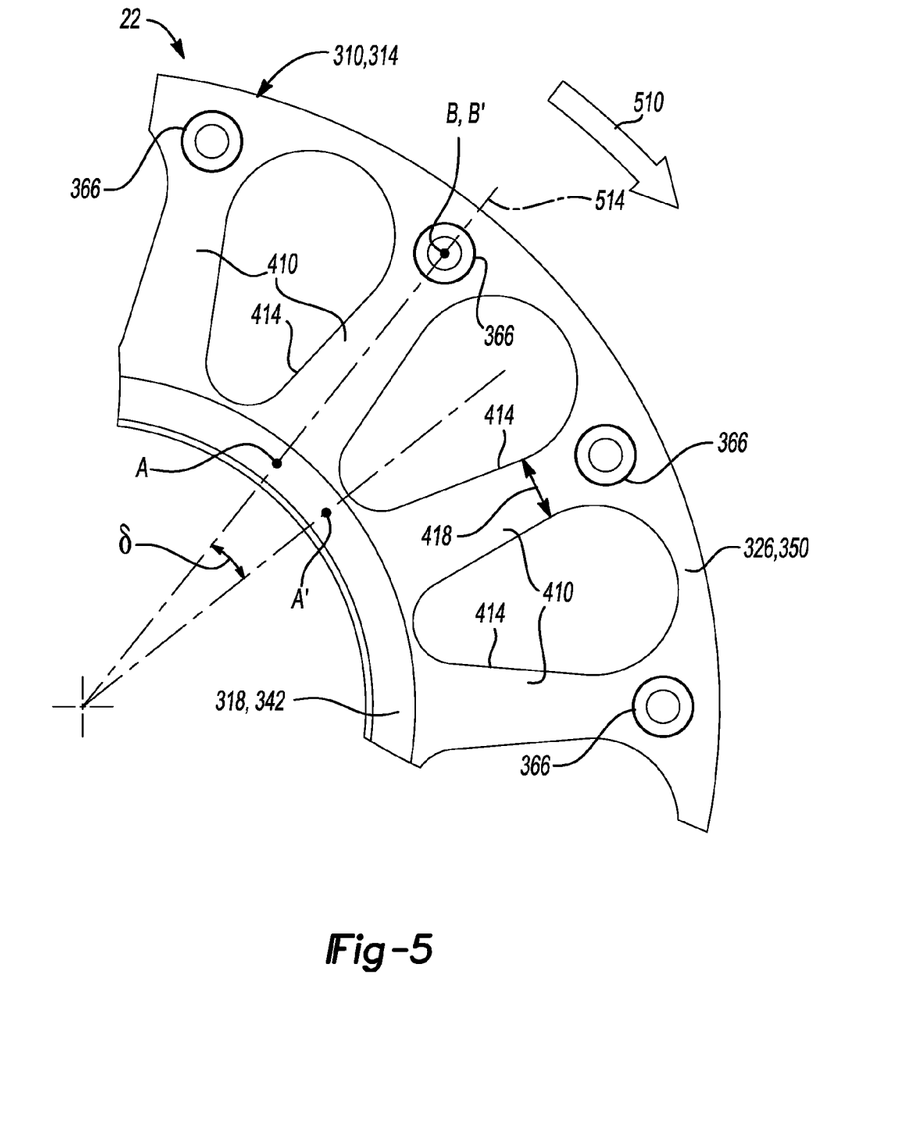
FIG. 5 is a plan view of a portion of the torsional damper of FIG. 2.

With additional reference to FIG. 3-5, the torsional damper 22 is illustrated in greater detail. The torsional damper 22 can include an input member 310 and an output member 314. The input member 310 can include a first hub 318 and a first disc 322 coupled to the first hub 318 for common rotation about the axis 34. The first disc 322 can extend radially outward from the first hub 318 to a first outer portion 326 of the first disc 322. The first hub 318 can be a generally cylindrical member that can extend axially outward from the first disc 322 in an axial direction that is away from the output member 314 and can define a central aperture 330. The central aperture 330 can be disposed about the axis 34 and concentric with the output shaft 32. The first hub 318 can be fixedly coupled to the output shaft 32 for common rotation. In the example provided, the first hub 318 includes a plurality of internal splines 334 disposed about the central aperture 330 that are meshingly engaged with a plurality of external splines 338 formed on an axial end of the output shaft 32. It is understood that other methods of fixedly coupling the output shaft 32 to the first hub 318 can be used. The input member 310 can be unitarily formed of a single piece of material (e.g. a metal blank).

The output member 314 can include a second hub 342 and a second disc 346 coupled to the second hub 342 for common rotation about the axis 34. The second disc 346 can extend radially outward from the second hub 342 to a second outer portion 350 of the output member 314. The second hub 342 can be a generally cylindrical member that can extend axially outward from the second disc 346 in an axial direction that is away from the input member 310 and can define a central aperture 354. The central aperture 354 can be disposed about the axis 34 and concentric with the output shaft 32. The second hub 342 can be fixedly coupled to the pinion shaft 40 for common rotation. In the example provided, the second hub 342 includes a plurality of internal splines 358 disposed about the central aperture 354 that are meshingly engaged with a plurality of external splines 362 formed on an axial end of the pinion shaft 40. It is understood that other methods of fixedly coupling the pinion shaft 40 to the second hub 342 can be used. The output member 314 can be unitarily formed of a single piece of material (e.g. metal blank).

The first and second outer portions 326, 350 of the input and output members 310, 314 can be fixedly coupled together for common rotation about the axis 34. In the example provided, the first and second outer portions 326, 350 are fixedly coupled by a plurality of fasteners 366 disposed circumferentially about the first and second outer portions 326, 350. With specific reference to FIG. 4, the fasteners 366 can extend through a plurality of bores 370 formed in the first and second outer portions 326, 350 and which can be evenly spaced about the first and second outer portions 326, 350. In the example provided, the fasteners 366 are a plurality of rivets, though other types of fasteners can be used, such as bolts or screws for example. In an alternative construction, not specifically shown, the first and second outer portions 326, 350 can be welded together, such as by one or more welds disposed about the perimeter of the torsional damper 22 for example.

The first and second outer portions 326, 350 can be coupled together such that an inner face 374 of the input member 310 can oppose and be spaced apart from an inner face 378 of the output member 314. The inner face 374 of the input member 310 can be defined by the first hub 318 and the portion of the first disc 322 that is radially inward of the first outer portion 326. The inner face 378 of the output member 314 can be defined by the second hub 342 and the portion of the second disc 346 that is radially inward of the second outer portion 350. In the example provided, the first and second outer portions 326, 350 of the input and output members 310, 314 extend axially outward from the corresponding inner faces 374, 378 toward each other such that the first and second outer portions 326, 350 abut each other and the inner faces 374, 378 are spaced apart from each other. The splines 334, 358 of the first and second hub 318, 342 and the splines 338, 362 of the output shaft 32 and the pinion shaft 40 can be configured such that the output shaft 32 and the pinion shaft 40 are axially spaced apart.

The first disc 322, the second disc 346, or both can include a plurality of spokes 410 circumferentially spaced about the corresponding discs 322, 346. The spokes 410 can be fixedly coupled at one end to the corresponding first or second hub 318, 342, and can extend radially outward from the first or second hub 318, 342 to be fixedly coupled to the corresponding first or second outer portions 326, 350. In the example provided, both the input member 310 and the output member 314 include spokes 410, such that a first set of the spokes 410 extend between the first hub 318 and the first outer portion 326, and a second set of the spokes 410 extend between the second hub 342 and the second outer portion 350. The spokes 410 can be evenly spaced about the corresponding discs 322, 346. The spokes 410 can be separated by circumferentially spaced apertures 414 (FIG. 3). In the example provided, the apertures 414 are generally a tear-drop or pedal shape, being narrower proximate to the hub 318, 342 and wider proximate to the outer portions 326, 350, though other shapes or configurations can be used. In the example provided, each outer portion 326, 350 forms a ring shape about the outermost perimeter of the torsional damper 22 such that the apertures 414 are closed (i.e. each of the spokes 410 of the input member 310 are coupled together by the first outer portion 326 and each of the spokes 410 of the output member 314 are coupled together by the second outer portion 350). In an alternative construction, not specifically shown, the apertures 414 can be open at the perimeter of the torsional damper 22, such that each spoke 410 of the input member 310 can have a free end that is coupled to a free end of a corresponding spoke 410 of the output member. In the example provided, the input and output members 310, 314 each have fourteen spokes, though other numbers of spokes can be used. Each spoke 410 can have a minimum width 418 (FIG. 5) that is greater than a maximum axial thickness 422 of the spoke 410 (FIG. 4). The number of fasteners 366 can equal the number of spokes 410 and each of the fasteners 366 can be circumferentially aligned with one of the spokes 410, though other configurations can be used.

In the example provided, the input member 310 and the output member 314 can be mirror images of each other, including the same number of spokes 410 and the same diameters of the central apertures 330, 354 of the hubs 318, 342, though other configurations can be used. For example, the input member 310 can have a different number of spokes 410 from the output member 314, and/or the hubs 318, 342 can be configured to be coupled to different sized shafts. For example, the central aperture 354 of the output member 314 can be a different diameter from the central aperture 330 of the input member 310, to accommodate a pinion shaft 40 of a different diameter than the output shaft 32. Likewise, the first hub 318 can be coupled to the pinion shaft 40 in a different manner than the second hub 342 and the output shaft 32.

In operation, the electric motor 14 can drive rotation of the output shaft 32 about the axis 34. The output shaft 32 can provide torque through the torsional damper 22 to the pinion shaft 40 as shown by arrow 510 (FIG. 5). In this way, the output shaft 32 can provide input torque to the first hub 318. The first hub 318 can provide torque to spokes 410 of the first disc 322. The spokes 410 of the first disc 322 can provide torque to the first outer portion 326. The first outer portion 326 can provide torque to the second outer portion 350 (e.g. through the fasteners 366). The second outer portion 350 can provide torque to the spokes 410 of the second disc 346. The spokes 410 of the second disc 346 can provide torque to the second hub 342. The second hub 342 can provide torque to the pinion shaft 40.

When the amount of torque transferred through the torsional damper 22 is high, such as during sudden starts, stops, or changes in direction of the rotation of either the output shaft 32 or the pinion shaft 40, the torque can cause the spokes 410 of the input member 310 and/or the output member 314 to flex. For example with reference to FIG. 5, a first point A on the first hub 318 can be aligned along an axis 514 that runs through the axis 34 and a second point B on the first outer portion 326 (e.g. the center of the fastener 366). When the torque is relatively low, the spokes 410 do not flex and points A and B remain aligned (i.e. rotate together at the same rate) while the torsional damper 22 rotates about the axis 34. When the torque input into the first hub 318 is high, the spokes 410 can flex such that point A can initially rotate through a greater rotational angle δ than point B (e.g. points A' and B'). Point B can remain momentarily stationary (shown as B') or initially rotate an amount less than point A, such that A' and B' are momentarily not aligned. After the initial impulse of torque, the resiliency of the spokes 410 can cause the first outer portion 326 to realign with the first hub 318. It is understood that points A, B, A', and B' are shown for illustrative purposes and their respective locations are not to scale. The resiliency of the spokes 410 can provide torsional compliance between the output shaft 32 and the pinion shaft 40. The spokes 410 can be any suitable material, such as a metal for example. In the example provided, the amount of torsional compliance can be approximately 4,000 newton-meters per radian, though the spokes 410 can be configured to provide more or less compliance depending on the requirements of the drive module 10. The torsional compliance provided by the torsional damper 22 can thus reduce mechanical shock through the transmission 18, reduce wear on various components in the transmission 18, and otherwise dampen gear noises caused by the transmission error (e.g. caused by gear tolerances).

While described above with reference to the torsional damper 22 coupling a hollow output shaft 32 to a hollow pinion shaft 40, the torsional damper 22 of the present teachings is applicable for providing torsional compliance between other types of shafts, such as two solid shafts or between a solid shaft and a hollow shaft for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A transmission comprising:
   an input member, the input member having a hollow tubular shape;
   an output member, the output member having a hollow tubular shape; and
   a torsional damper including:
      a first member including a first hub, a first outer portion, and a plurality of first spokes, the first hub being non-rotatably coupled to the input member for common rotation with the input member about an axis, the first outer portion being radially outward of the first hub, the first spokes extending radially between the first hub and the first outer portion, the first spokes coupling the first outer portion to the first hub; and
      a second member including a second hub and a second outer portion, the second hub being non-rotatably coupled to the output member for common rotation with the output member about the axis, the second outer portion being radially outward of the second hub and fixedly coupled to the second hub and to the first outer portion, the first and second hubs defining a central aperture; and
   a first shaft drivingly coupled to one of the input member or the output member to receive torque from the one of the input member or the output member, the first shaft being supported for rotation about the axis relative to the input member and the output member, and the first shaft being received concentrically within the input and output.

2. The transmission of claim 1, wherein the second member includes a plurality of second spokes, the second spokes extending radially between the second hub and the second outer portion and fixedly coupling the second hub to the second outer portion.

3. The transmission of claim 1, further comprising a gear set drivingly coupled to the output member to receive torque from the output member, the first shaft being drivingly coupled to the gear set to receive torque from the output member through the gear set.

4. The transmission of claim 3, further comprising an electric motor, the electric motor including a stator and a rotor, the rotor being drivingly coupled to the input member.

5. The transmission of claim 4, wherein the rotor fixedly coupled to the input member for common rotation about the axis.

6. The transmission of claim 3, further comprising a second shaft, wherein the gear set includes a differential configured to receive input torque from the output member and to output differential torque to the first and second shafts.

7. The transmission of claim 1, wherein the first member defines a first face and the second member defines a second face that opposes the first face and is axially spaced apart from the first face.

8. The transmission of claim 1, further comprising a plurality of fasteners, each of the fasteners extending axially between the first and second outer portions to fixedly couple the first and second outer portions.

9. The transmission of claim 8, wherein the first member is a first unitary body that defines the first hub, first spokes, and first outer portion, and the second member is a second unitary body that defines the second hub and second outer portion.

10. A transmission comprising:
a housing;
a first shaft supported within the housing for rotation about an axis;
a second shaft received concentrically within the first shaft;
a torsional damper including:
a first member including a first hub and a plurality of first spokes, the first hub defining a central aperture that is coaxial with the axis, a proximal end of each first spoke being fixedly coupled to the first hub, each first spoke extending radially outward from the first hub to a distal end of the first spoke; and
a second member including a second hub and an outer portion, the second hub defining a central aperture that is coaxial with the axis, the outer portion being fixedly coupled to the second hub and extending radially outward from the second hub, the outer portion being fixedly coupled to the distal end of each first spoke;
wherein one of the first and second hubs is fixedly coupled to the first shaft for common rotation about the axis, and the second shaft extends through the central apertures of the first and second hubs and is drivingly coupled to the other one of the first and second hubs while being rotatable about the axis relative to the first and second hubs.

11. The transmission of claim 10, further comprising a third shaft supported within the housing for rotation about the axis and disposed concentrically about the second shaft, wherein the central aperture of the first hub defines a first set of internal splines matingly engaged with a first set of external splines defined by the first shaft, and the central aperture of the second hub defines a second set of internal splines matingly engaged with a second set of external splines defined by the third shaft.

12. The transmission of claim 10, wherein the outer portion of the second member includes a plurality of second spokes, a proximal end of each second spoke being fixedly coupled to the second hub, each second spoke extending radially outward from the second hub to a distal end of the second spoke, the distal end of each second spoke being fixedly coupled to a distal end of a corresponding one of the first spokes.

13. The transmission of claim 10, further comprising gear set and a third shaft, the third shaft being coupled for common rotation with the other one of the first and second hubs, the gear set being drivingly coupled to the third shaft to receive torque from the third shaft, the second shaft being drivingly coupled to the gear set to receive torque from the gear set, the second shaft being received concentrically within the first and third shafts.

14. The transmission of claim 13, further comprising an electric motor, the electric motor including a stator and a rotor, the rotor being coupled to the first shaft for common rotation about the axis.

15. The transmission of claim 13 further comprising a fourth shaft, wherein the gear set includes a differential configured to receive input torque from the third shaft and to output differential torque to the second and fourth shafts.

16. The transmission of claim 10, wherein the first member defines a first face and the second member defines a second face that opposes the first face and is axially spaced apart from the first face.

17. The transmission of claim 10, further comprising a plurality of fasteners, each of the fasteners extending axially between one of the distal ends of the first spokes and the outer portion to fixedly couple the distal ends of the first spokes to the outer portion.

18. The transmission of claim 17, wherein the first member is a unitary body that defines the first hub, and first spokes, and the second member is a unitary body that defines the second hub and second outer portion.

19. The transmission of claim 10, wherein the distal ends of the first spokes are fixedly coupled together about an outer radial periphery of the first member.

20. The transmission of claim 1, wherein the first hub defines a first set of internal splines matingly engaged with a first set of external splines defined by the input member, and the second hub defines a second set of internal splines matingly engaged with a second set of external splines defined by the output member.

* * * * *

UNITED STATES PATENT AND TRADEMARK OFFICE
CERTIFICATE OF CORRECTION

PATENT NO.        : 9,593,741 B2                                    Page 1 of 1
APPLICATION NO.   : 14/707036
DATED             : March 14, 2017
INVENTOR(S)       : Magnus Hederstad et al.

It is certified that error appears in the above-identified patent and that said Letters Patent is hereby corrected as shown below:

In the Claims

Column 8, In Line 51 of Claim 1, delete "output" and insert --output members, through the central aperture.--, therefor.

Signed and Sealed this
Thirtieth Day of May, 2017

Michelle K. Lee
*Director of the United States Patent and Trademark Office*